United States Patent
Tani

(10) Patent No.: US 6,724,364 B2
(45) Date of Patent: Apr. 20, 2004

(54) LEARNING-TYPE MOVEMENT CONTROL APPARATUS, METHOD THEREFOR, AND DISTRIBUTION MEDIUM THEREFOR

(75) Inventor: Jun Tani, Tokyo (JP)

(73) Assignee: Sony Corporation, Tokyo (JP)

( * ) Notice: Subject to any disclaimer, the term of this patent is extended or adjusted under 35 U.S.C. 154(b) by 104 days.

(21) Appl. No.: 09/733,682

(22) Filed: Dec. 8, 2000

(65) Prior Publication Data
US 2001/0028339 A1 Oct. 11, 2001

(30) Foreign Application Priority Data
Dec. 10, 1999 (JP) .............................. 11-352230

(51) Int. Cl.$^7$ ................................. G09G 5/00
(52) U.S. Cl. ........................... 345/156; 706/15; 706/16; 706/21
(58) Field of Search .................. 345/156; 382/155, 382/157; 395/21; 706/4, 14, 15, 25, 12, 21

(56) References Cited

U.S. PATENT DOCUMENTS 5,606,646 A * 2/1997 Khan et al.
5,673,367 A * 9/1997 Buckley
5,778,885 A * 7/1998 Doyama et al.
5,909,676 A * 6/1999 Kano \* cited by examiner Primary Examiner—Matthew C. Bella
Assistant Examiner—Hau Nguyen
(74) Attorney, Agent, or Firm—Frommer Lawrence & Haug LLP; William S. Frommer; Hans R. Mahr

(57) ABSTRACT

A learning-type movement control apparatus that learns the movement of an operation control device, predicts the movement thereof, and drives it so as to automatically move. The apparatus comprises an operation control device having a predetermined portion that is displaced according to a force exerted in an arbitrary direction, outputs the amount of the displacement at least as one-dimensional position-representing information, receives a feedback signal carrying information generated by adding displacement information to the position-representing information, and drives the predetermined portion according to a direction and a displacement that are based on the feedback signal. The apparatus also includes a learning section that receives the position-representing information and performs learning of the movement of the operation control device. The apparatus further includes a predicting section that performs prediction of a displacement of the operation control device according to the position-representing information the learning result of the learning section, and generates the feedback signal by adding the displacement information to the position-representing information.

17 Claims, 4 Drawing Sheets ically move;

LEARNING-TYPE MOVEMENT CONTROL APPARATUS, METHOD THEREFOR, AND DISTRIBUTION MEDIUM THEREFOR

BACKGROUND OF THE INVENTION

1. Field of the Invention

The present invention relates to a learning-type movement control apparatus that has functions of learning force-input time series patterns and performing force feedback based on the learning, wherein a force-input section and a control system interactively function.

Furthermore, the invention relates to a method for implementing the functions in the aforementioned learning-type movement control apparatus.

Still furthermore, the present invention relates to a distribution medium for a computer-readable program that allows an information processor to execute the aforementioned method.

2. Description of the Related Art

Conventionally, an operation control device, such as a joystick or a steering wheel, is used by a user to move a predetermined portion of a movable object. The object may be a transportation means, such as a four-wheel vehicle, a two-wheel vehicle, or an aircraft; or the object may be a cursor on the screen of an information processor. To move the object as the user desires, the user must operate the operation control device to issue operation commands to the object. To issue the operation commands, the user must exert predetermined forces on the operation control device in directions along which the user wishes to move the object. Namely, the user must determine options, such as the direction and the distance of the movement of the object.

In the conventional device as described above, when the above is considered on the side of the object to be moved, the operation command must be issued each time the user attempts to operate the operation control device, such as the steering wheel or the joystick. For the user to operate the object to meet his or her desire, and even when substantially the same movement is performed, the user must intermittently or continually operate the operation control device. That is, since the conventional device has no learning function in the operation control device, even to repeat a movement, the user must perform complicated and time-consuming operations with the operation control device. This is disadvantageous.

SUMMARY OF THE INVENTION

The present invention is made under the above-described circumstances. Accordingly, objects thereof are to provide:

a learning-type movement control apparatus that has the functions of learning the movement of an operation control device, predicting the movement thereof, and driving it to automatically move;

a method implementing the functions of the aforementioned learning-type movement control apparatus; and a medium for distributing a computer-readable program that allows an information processor to execute the aforementioned method.

To achieve the aforementioned objects, according to one aspect of the present invention, a learning-type movement control apparatus comprises an operation control device, a learning section, and a predicting section. The operation control device has a predetermined portion that is displaced according to a force exerted in an arbitrary direction. The operation control device outputs the amount of the displacement at least as one-dimensional position-representing information, receives a feedback signal carrying information generated by adding displacement information to the position-representing information, and drives the predetermined portion according to a direction and a displacement that are based on the feedback signal. The learning section receives the position-representing information, which is input in time series from the operation control device, and performs learning of the movement of the operation control device. The predicting section performs prediction of a displacement of the operation control device according to the position-representing information that is input in time series from the operation control device and a result of the learning by the learning section, and generates the feedback signal by adding the displacement information to the position-representing information, and outputs the feedback signal to the operation control device.

The learning section and the predicting section may be included in a recurrent neural network that comprises an input layer, a hidden layer, and an output layer. The recurrent neural network may be of a type that performs feedback from the output layer to the input layer. In addition, the learning section may be arranged to perform the learning of the movement of the predetermined portion of the operation control device according to an error propagation method.

According to another aspect of the invention, a learning-type movement control method comprises three processing steps. A first step performs learning of a pattern of a time-series force input to an operation control device by using a recurrent neural network. A second step performs prediction of information regarding movement of a predetermined portion of the operation control device by using the recurrent neural network according to a result of the learning. A third step drives the operation control device to move according to the information regarding the movement, which has been obtained as a result of the prediction.

According to still another aspect of the present invention, a distribution medium for distributing a computer-readable program that allows an information-processing unit to execute processing which comprises three steps is provided. A first step performs learning of a pattern of a time-series force input to an operation control device by using a recurrent neural network. A second step performs prediction of information regarding movement of a predetermined portion of the operation control device by using the recurrent neural network according to a result of the learning. A third step drives the operation control device to move according to the information regarding the movement, which has been obtained as a result of the prediction.

Thus, according to the present invention, for example, a user exerts a desired force on the operation control device in a desired direction. The operation control device is thereby operated so as to perform the movement desired by the user. According to the exerted force and the direction thereof, the predetermined portion of the operation control device is displaced. The amount of the displacement is separated into two-dimensional position-representing information items (x, y). Then, the position-representing information items (x, y) are output in time series to the learning section and the predicting section.

The learning section receives the position-representing information items (x, y), and performs, for example, learning of movements of the operation control device a predetermined number of times. It learns the movements according to, for example, an error propagation method.

According to the position-representing information items (x, y) and a result of the learning by the learning section, the predicting section performs prediction of a position the operation control device at a subsequent time. Then, the predicting section adds displacement information items to the position-representing information items (x, y), thereby generates a feedback signal, and outputs it to the operation control device.

Having received the feedback signal from the predicting section, and according to directions and displacements specified by the feedback signal, the predetermined portion of the operation control device is driven in either the positive direction or the negative direction of each of the x and y directions.

The above-described operations are iterated, and during the iteration, the movement of the operation control device is incrementally learned by the learning section and is predicted by the predicting section. This allows the predetermined portion of the operation control device to operate according to the prediction without a force being exerted by the user.

In the above state, that is, when the predetermined portion of the operation control device operates according to only the instruction given by the feedback signal, the user can exert a desired force in a desired direction on the operation control device. Accordingly, the position-representing information items (x, y) regarding the movement at the particular time are output in time series.

Then, according to the interaction of the learning section, the predicting section, and the driving section, the new movement is learned. The result of the learning allows prediction information to be provided. According to the prediction information, without a force being exerted by the user, the predetermined portion of the operation control device becomes enabled to implement the new movement.

Thus, the present invention is advantageous in that it provides a practically effective system in which, without complicated operations being performed, the movement of the operation control device is learned, and the movement is thereby predicted to allow the operation control device to automatically move.

DESCRIPTION OF THE PREFERRED EMBODIMENTS

Figure 1:
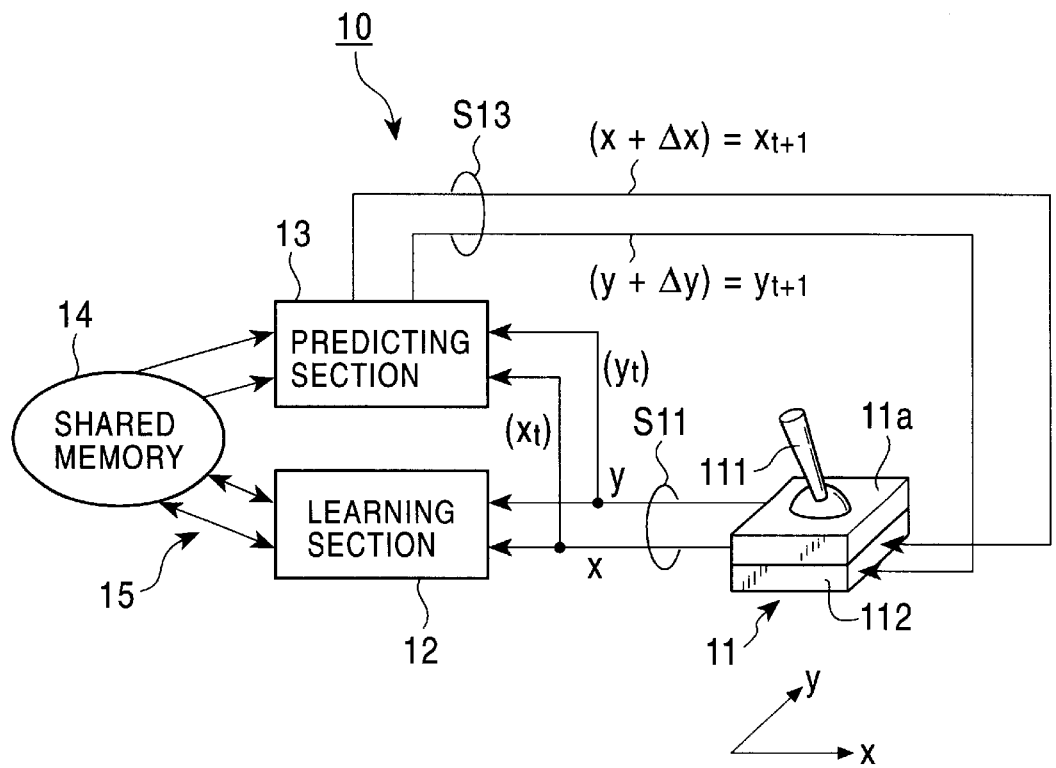
FIG. 1 shows the configuration of an embodiment of a learning-type force feedback interactive system according to the present invention.

FIG. 1 is a schematic view of a learning-type force feedback interactive system 10. The learning-type force feedback interactive system 10 is referred to as an embodiment of a movement control apparatus that employs a movement control method according to the present invention.

The learning-type force feedback interactive system 10 comprises as primary components a joystick 11 (operation control device), a learning section 12, a predicting section 13, and a shared memory 14.

The joystick 11 functions to output a signal S11 to the learning section 12 and the predicting section 13. When a force is exerted by, for example, a user, on a stick portion 111 in a desired direction, a predetermined portion is displaced according to the force. The predetermined portion is not shown in the drawing, but it can be, for example, an end section in a main body 11a. The amount of the displacement is separated into position-representing information items (x, y) in two-dimensional rectangular coordinate system, as defined and shown in FIG. 1. The position-representing information items (x, y) are output in time-series as a signal S11 to the learning section 12 and the predicting section 13.

The joystick 11 includes, for example, a servomotor (not shown) in a driving section 112. The driving section 112 drives the displaceable predetermined portion according to the direction and the displacement specified by a signal from the predicting section 13 in either the positive direction or the negative direction of each of the x and y directions.

The predicting section 13 issues a feedback signal S13 which is supplied to the driving section 112 of the joystick 11. The feedback signal S13 represents information generated by adding displacement information items ($\Delta x$, $\Delta y$) to the position-representing information items (x, y).

As described above, the learning section 12 receives the signal S11 including the position-representing information items (x, y), which have been supplied in time series from the joystick 11. In response to the signal S11, the learning section 12 performs so-called online learning. It performs learning on the two-dimensional movements of the joystick 11 and stores the result of the learning in the shared memory 14. In addition, according to the information stored therein, the learning section 12 iterates the learning a predetermined number of times.

According to the signal S11 including current-time position-representing information items (x, y)(=($x_t$, $y_t$)) and the learning results stored in the shared memory 14, the predicting section 13 predicts a subsequent-time position. Then, it adds the displacement information items ($\Delta x$, $\Delta y$) to the position-representing information items (x, y). Thereby, the predicting section 13 outputs the addition result to the driving section 112 of the joystick 11 via the feedback signal S13. The feedback signal S13 therefore carries the information (x+$\Delta x$, y+$\Delta y$)(=($x_{t+1}$, $y_{t+1}$)).

The learning section 12, the predicting section 13, and the shared memory 14 are provided, for example, on the side of a computer main unit (not shown). In reality, they function as primary components that are included (connected to) in a recurrent neural network RNN.

Figure 2:
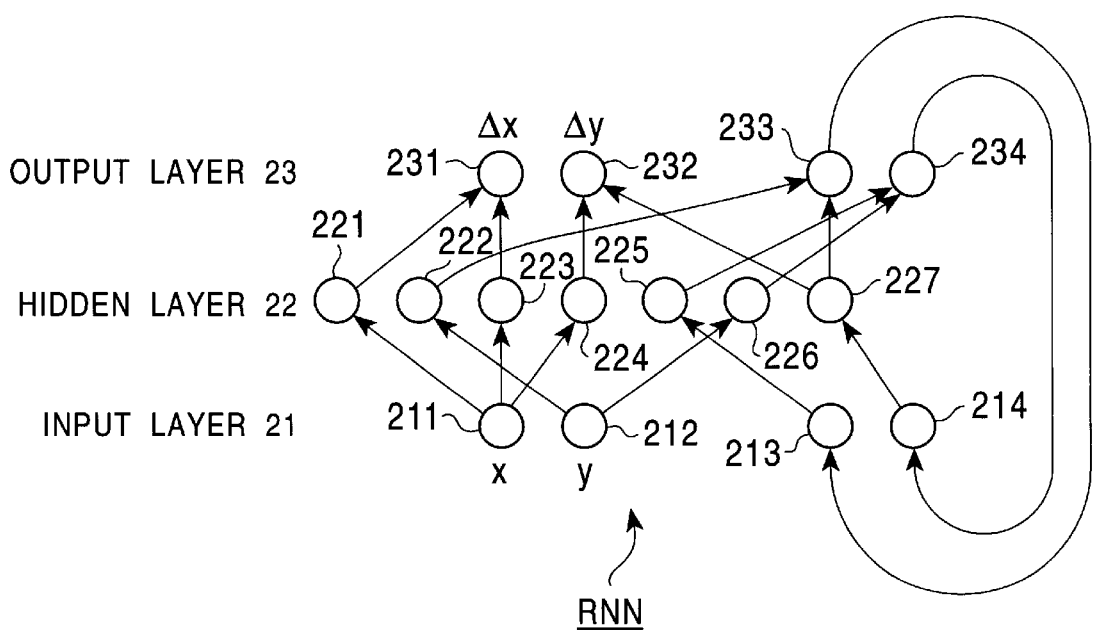
FIG. 2 shows an example configuration of a recurrent neural network according to the embodiment.

FIG. 2 shows an example of the recurrent neural network with reference to symbol RNN.

As shown in the figure, the recurrent neural network RNN has a hierarchical structure. It comprises an input layer 21, a hidden layer 22, and an output layer 23, each of which is described below.

The input layer 21 includes a predetermined number of neurons, for example, four neurons 211 to 214. Among the neurons 211 to 214, the two neurons 211 and 212 receives the position-representing information items x and y as inputs, respectively. As already described, the position-representing information items x and y are supplied in time series by the output signal S11 of the joystick 11. The two other neurons 213 and 214 are used as feedback neurons from so called context in the output layer 23.

The hidden layer 22 includes a predetermined number of neurons, for example, seven neurons 221 to 227. The neurons 221 to 227 randomly receive outputs of the individual neurons 211 to 214 in the input layer 21.

The output layer 23 includes a predetermined number of neurons, for example, four neurons 231 to 234. Among the neurons 231 to 234, the two neurons 231 and 232 individually incorporate the outputs of the neurons in the hidden layer 22, and generate the displacement information items Δx and Δy, respectively. As already described, the displacement information items Δx and Δy relate to the position-representing information items x and y of feedback signal S13, respectively, which are output to the joystick 11. The two other neurons 233 and 234 are used as the feedback neurons that will be sent to the input layer 21.

As a result of, for example, the learning, each of the neurons memorizes a predetermined weight coefficient. It multiplies an input by the weight coefficient, and outputs the multiplication result to another neuron or neurons.

Hereinbelow, practical examples of operations of the learning section 12 and the predicting section 13, which will be performed in the recurrent neural network RNN.

Figure 3:
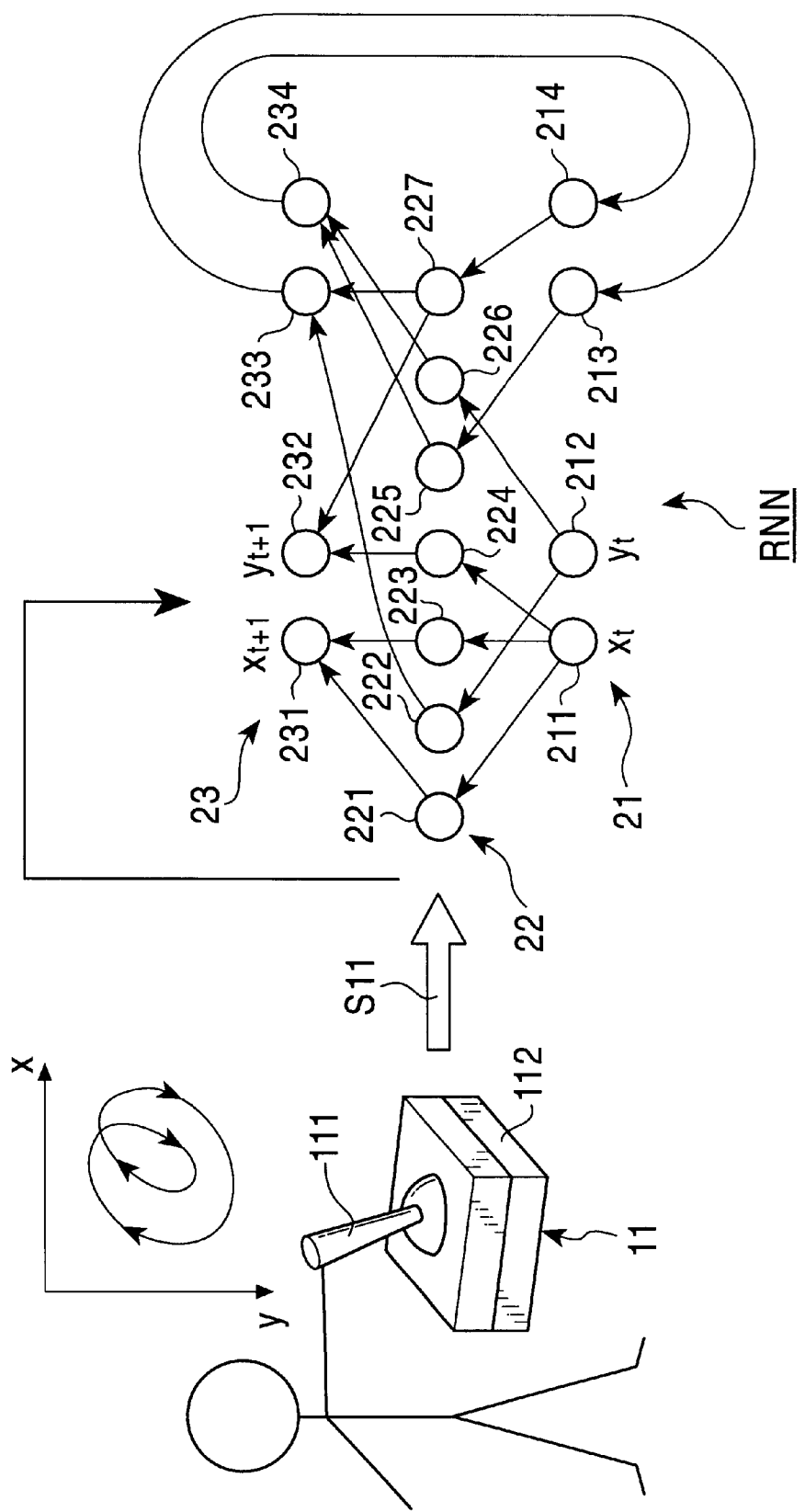
FIG. 3 is a view used to explain the operation of a learning section connected to the recurrent neural network according to the embodiment.

First of all, as shown in FIG. 3, the learning section 12 in the recurrent neural network RNN execute a rehearsal sequence. Then, it performs learning.

A. Rehearsal Sequence (1) Random initialization with values between 0 and 1 is performed for input units 211 and 212 (input values thereof) in the input layer 21 and context units of the recurrent neural network RNN.

(2) The recurrent neural network RNN is set to a closed-loop mode in which outputs are applied to inputs as self-feedback, and an N-step sequence is generated from initial values produced after the initialization.

(3) The initialization mentioned in (1) and the generating processing mentioned in (2) are iterated L times, and L rows of rehearsal sequences are thereby obtained.

B. Learning (1) The aforementioned L rows of rehearsal sequences and one row of experience sequence are added together, and (L+1) rows of learning sequences are thereby prepared.

(2) The aforementioned rows of learning sequences are learned M times in the recurrent neural network RNN according to, for example, an error propagation method (Reference: D. E. Rumelhart et al., "Parallel Distributed Processing", MIT Press, 1986). Thereby, a weights matrix stored in the shared memory 14 is updated.

When the error propagation method is used, two learning methods can be performed. In one method, when the error between an output obtained according to a pattern provided to the input layer 21 and a pattern required for the output layer 23 becomes equal to or less than a predetermined value, the learning is terminated. In the other method, the learning is terminated after it is iterated a predetermined number of times.

Figure 4:
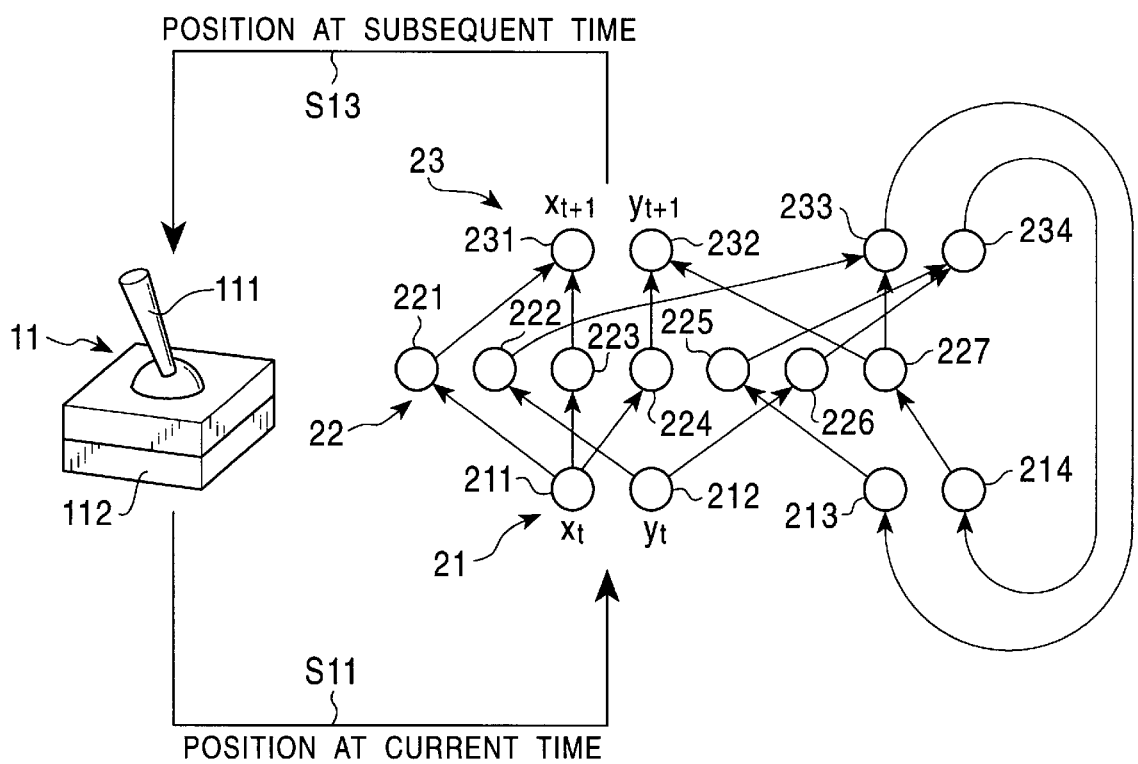
FIG. 4 is a view used to explain the operation of a predicting section connected to the recurrent neural network according to the embodiment.

Hereinbelow, the performance of the predicting section 13 will be described below with reference to FIG. 4.

In the predicting section 13, input nodes receive the position-representing information items (x, y)(=(xt, yt)) regarding the predetermined portion of the joystick 11 at the current time. Output values (Δx, Δy) of the recurrent neural network RNN are received as displacement information items. Then, the feedback signal S13 including the information (x+Δx, y+Δy)(=($x_{t+1}$, $y_{t+1}$)), which has been obtained by adding the displacement information items (Δx, Δy) to the position-representing information items (x, y), is output to the joystick 11, which is provided as the operation control device.

Hereinbelow, a description will be given of the operation performed by the above-described configuration.

First of all, in the recurrent neural network RNN, random initialization is performed for the input neurons 211 and 212 (input values thereof) in the input layer 21 and context units (neurons) 213, 214, 233, and 234 of the recurrent neural network RNN. The recurrent neural network RNN is set to a closed-loop mode, and an N-step sequence is generated from post-initialization initial values. Then, the initialization processing and the generation processing of the N-step sequence are iterated L times, and L rows of rehearsal sequences can be thereby obtained.

Figure 5A:
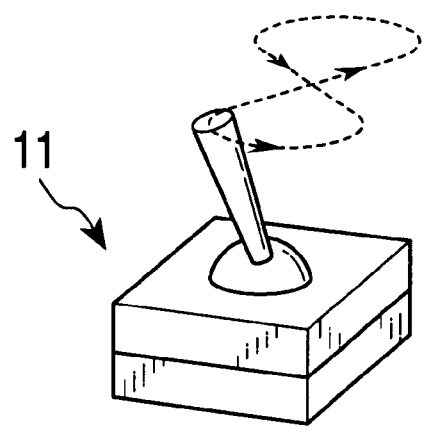
FIGS. 5A to 5C are views used to explain the operation of the learning-type force feedback interactive system according to the embodiment.
Figure 5B:
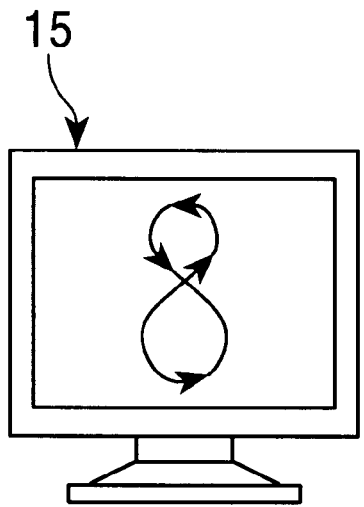

In this state, for example, as shown in FIGS. 5A and 5B, a user (not shown) exerts a desired force in a desired direction on the stick portion 111 of the joystick 11. Thereby, the stick portion 111 is moved in such a manner as to form a figure "8". According to the exerted force and the direction thereof, the predetermined portion of the stick portion 111 is displaced. Subsequently, the displacement amount is separated into the two-dimensional position-representing information items (x, y), and the position-representing information items (x, y) are output in time series as the signal S11 to the learning section 12 and the predicting section 13.

In the learning section 12, first of all, the L rows of rehearsal sequences are added to one row of experience sequence. Namely, the position-representing information items (x, y) regarding the joystick 11 are added thereto. Thereby, (L+1) rows of learning sequences are prepared. Subsequently, in the recurrent neural network RNN, the aforementioned rows of learning sequences are learned M times according to, for example, the error propagation method. Thereby, the weights matrix stored in the shared memory 14 is updated.

In the predicting section 13, the position-representing information items (x, y)(=($x_t$, $y_t$)) regarding the predetermined portion of the joystick 11 at the current time are supplied. In addition, the output values (Δx, Δy) of the recurrent neural network RNN are received as the displacement information items. Subsequently, the feedback signal S13 is generated and is output to the driving section 112 of the joystick 11. The feedback signal S13 includes the information items (x+Δx, y+Δy)(=($x_{t+1}$, $y_{t+1}$)) obtained by adding the displacement information items (Δx, Δy) to the position-representing information items (x, y).

In the driving section 112 of the joystick 11, the feedback signal S13 is received from the predicting section 13. Then, according to the direction and the displacement that are specified by the feedback signal S13, the predetermined portion of the stick portion 111 is driven in either the positive direction or the negative direction of each of the x and y directions.

Figure 5C:
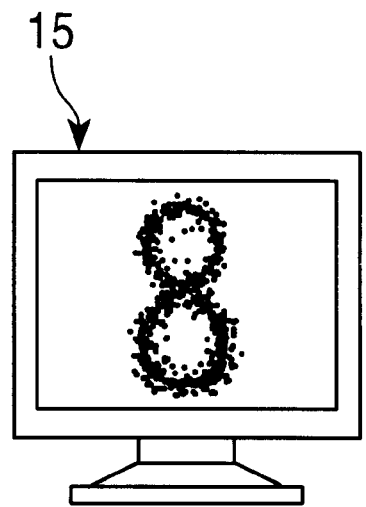

The above-described operations are iterated, and during the iteration, as shown in FIG. 5C, the movement that is similar to forming the figure "8" is incrementally learned by the learning section 12 and is predicted by the predicting section 13. This allows the stick portion 111 of the joystick 11 to operate according to the prediction without a force being exerted by the user.

In the above state, that is, when the stick portion 111 of the joystick 11 operates according to only the instruction given by the feedback signal S13, the user can exert a desired force in a desired direction on the stick portion 111. Thereby, the stick portion 111 moves differently from the movement that is similar to forming the figure number "8". In this case, the position-representing information items (x, y) regarding the above movement are output in time series as the signal S11.

After the above, according to the interaction of the learning section 12, the predicting section 13, and the driving section 112, a new movement is learned. The result of the learning allows prediction information to be provided. According to the prediction information, without a force being exerted by the user, the stick portion 111 of the joystick 11 is able to perform a new movement that is different from the movement that is similar to forming the figure "8".

Thus, the described embodiment has the advantages that, without complicated and time-consuming operations being performed, the movement of the operation control device is learned, and the movement is thereby predicted to allow the operation control device to automatically operate. The embodiment can exhibit these advantages because it has the joystick 11, the learning section 12, and the predicting section 13.

The joystick 11 has the predetermined portion (not shown). When a force is exerted by, for example, a user, the predetermined portion is displaced according to the force exerted in a direction desired by the user. The joystick 11 separates the amount of the displacement into the two-dimensional position-representing information items (x, y) and outputs them in time series as the signal S11. According to the direction and the displacement that are based on the feedback signal S13, the joystick 11 drives the displaceable predetermined portion in either the positive direction or the negative direction of each of the x and y directions.

The learning section 12 is connected to the recurrent neural network RNN and receives the signal S11 including the position-representing information items (x, y) supplied in time series from the joystick 11. In response to the signal, the learning section 12 performs the online learning of the two-dimensional movement of the joystick 11 and stores the result of the learning in the shared memory 14. In addition, according to the information stored therein, the learning section 12 performs the learning a predetermined number of times.

The predicting section 13 is also connected to the recurrent neural network RNN. The predicting section 13 predicts a subsequent-time position according to the signal S11 including current-time position-representing information items (x, y)(=($x_t$, $y_t$)) and the learning results stored in the shared memory 14. Then, the predicting section 13 adds the displacement information items (Δx, Δy) to the position-representing information items (x, y). Thereby, the predicting section 13 outputs the added result as a feedback signal S13 including the information (x+Δx, y+Δy)(=($x_{t+1}$, $y_{t+1}$)) to the joystick 11.

As above, in the present embodiment, although description has been made with reference to the example configuration where the joystick 11 receives two-dimensional information items x and y, the present invention is not limited thereto. The invention may be configured to permit the joystick 11 to receive, for example, three-dimensional information items x, y, and z. In this case, for the additional information item z, the number of input neurons in the input layer 21 of the recurrent neural network RNN are increased by one, and similarly, a neuron for a positional-variation Δz is added to the neurons in the output layer 23 of the recurrent neural network RNN.

Also, although the embodiment has been described with reference to the joystick 11 as an example control object, the invention is not limited thereto. The invention can control a steering wheel and various other devices. In addition, the invention may also be applied to, for example, entertainment apparatuses and other apparatuses.

Furthermore, the above-described processing is programmed for execution with a computer. The computer program can be distributed to users by various methods of distribution. For example, the program may be distributed via various computer-readable recording media including a compact disk read only memory (CD-ROM) and a solid-state memory, and via communication methods including communication networks and satellites.

What is claimed is:

1. A learning-type movement control apparatus comprising:

an operation control device that has a predetermined portion which is displaced according to a force exerted in an arbitrary direction, that outputs the amount of the displacement at least as one-dimensional position-representing information, that receives a feedback signal carrying information generated by adding displacement information to the position-representing information, and that drives said predetermined portion according to a direction and a displacement that are based on the feedback signal;

a learning section that receives the position-representing information which is input in time series from said operation control device and that performs learning of the movement of said operation control device; and a predicting section that performs prediction of the displacement of said operation control device according to the position-representing information that is input in time series from said operation control device and a result of the learning by said learning section, that generates the feedback signal by adding the displacement information to the position-representing information, and that outputs the feedback signal to said operation control device.

2. A learning-type movement control apparatus as claimed in claim 1, further comprising a recurrent neural network that comprises:

said learning section;
said predicting section;
an input layer;
a hidden layer; and
an output layer.

3. A learning-type movement control apparatus as claimed in claim 2, wherein said recurrent neural network performs feedback from said output layer to said input layer.

4. A learning-type movement control apparatus as claimed in claim 1, wherein said learning section performs the learning of the movement of said predetermined portion of said operation control device according to an error propagation method.

5. A learning-type movement control apparatus as claimed in claim 2, wherein said learning section performs the learning of the movement of said predetermined portion of said operation control device according to an error propagation method.

6. A learning-type movement control apparatus as claimed in claim 3, wherein said learning section performs the learning of the movement of said predetermined portion of said operation control device according to an error propagation method.

7. A learning-type movement control method comprising the steps of:

performing learning of a time-series pattern of movement information output by an operation control device by using a recurrent neural network, where said movement information output by said operation control device is based on movement of a predetermined portion of said operation control device according to a pattern of force applied to said operation control device;

performing prediction of information regarding movement of said predetermined portion of said operation control device by using said recurrent neural network according to a result of the learning;

providing a feedback signal to said operation control device, where said feedback signal is the sum of the movement information output by the operation control device and the predicted movement information; and driving said operation control device to move according to said feedback signal.

8. A learning-type movement control method as claimed in claim 7, wherein said recurrent neural network performs feedback from an output layer to an input layer.

9. A learning-type movement control method as claimed in claim 7, wherein said learning section performs the learning of the movement of said predetermined portion of said operation control device according to an error propagation method.

10. A learning-type movement control method as claimed in claim 8, wherein said learning section performs the learning of the movement of said predetermined portion of said operation control device according to an error propagation method.

11. A distribution medium for distributing a computer-readable program that allows an information-processing unit to execute processing comprising the steps of:

performing learning of a time-series pattern of movement information output by an operation control device by using a recurrent neural network, where said movement information output by said operation control device is based on movement of a predetermined portion of said operation control device according to a pattern of force applied to said operation control device;

performing prediction of information regarding movement of said predetermined portion of said operation control device by using said recurrent neural network according to a result of the learning;

providing a feedback signal to said operation control device, where said feedback signal is the sum of the movement information output by the operation control device and the predicted movement information; and driving said operation control device to move according to said feedback signal.

12. A learning-type movement control apparatus as claimed in claim 1, where the operation control device is for controlling the movement of a position indicating item on a display in a computer system.

13. A learning-type movement control apparatus as claimed in claim 3, wherein said input layer includes one or more input context neurons and said output layer includes one or more output context neurons, and wherein each output context neuron provides data to a corresponding input context neuron.

14. A learning-type movement control method as claimed in claim 7, where the movement of said operation control device controls the movement of a position indicating item on a display in a computer system.

15. A learning-type movement control method as claimed in claim 8, wherein said input layer includes one or more input context neurons and said output layer includes one or more output context neurons, and wherein each output context neuron provides data to a corresponding input context neuron.

16. A distribution medium as claimed in claim 11, where the movement of said operation control device controls the movement of a position indicating item on a display in a computer system.

17. A distribution medium as claimed in claim 11, wherein:

said recurrent neural network performs feedback from an output layer to an input layer, said input layer includes one or more input context neurons, said output layer includes one or more output context neurons, and each output context neuron provides data to a corresponding input context neuron.

* * * * *